US008798846B2

(12) United States Patent
Takahashi (10) Patent No.: US 8,798,846 B2
(45) Date of Patent: Aug. 5, 2014

(54) POWER LIMITING SYSTEM AND METHOD BASED UPON BRAKE ROTOR TEMPERATURE DETERMINATION (75) Inventor: Shigenori Takahashi, Anjo (JP)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 214 days.

(21) Appl. No.: 13/550,477

(22) Filed: Jul. 16, 2012

(65) Prior Publication Data
US 2013/0274970 A1 Oct. 17, 2013

Related U.S. Application Data (60) Provisional application No. 61/623,502, filed on Apr. 12, 2012.

(51) Int. Cl.
B60L 3/00 (2006.01)
B60K 26/00 (2006.01)
B60L 11/18 (2006.01)

(52) U.S. Cl.
USPC .......................... 701/29.2; 701/99

(58) Field of Classification Search
USPC ........... 701/22, 36, 45, 48, 70, 78, 83, 84, 86, 701/91, 99, 29.2, 33.9, 34.4; 188/1.11 E
See application file for complete search history.

(56) References Cited

U.S. PATENT DOCUMENTS

| 5,731,975 | A  | * | 3/1998 | Nakashima ..................... 701/83 |
| 6,505,894 | B2 |   | 1/2003 | Dunning et al. |
| 6,553,304 | B2 |   | 4/2003 | Walenty et al. |
| 6,612,736 | B2 | * | 9/2003 | Lee et al. ..................... 374/153 |
| 7,152,935 | B2 | * | 12/2006 | Kinder et al. ................. 303/191 |
| 7,244,003 | B2 |   | 7/2007 | Larson |
| 7,404,316 | B2 |   | 7/2008 | Svensson |
| 7,694,555 | B2 |   | 4/2010 | Howell et al. |
| 7,883,159 | B2 |   | 2/2011 | Miyazaki |
| 7,957,875 | B2 |   | 6/2011 | Antanaitis et al. |
| 8,326,509 | B2 | * | 12/2012 | Logan et al. .................... 701/83 |
| 2003/0216849 | A1 | * | 11/2003 | Eckert et al. .................... 701/71 |
| 2009/0125286 | A1 |   | 5/2009 | Waltz |
| 2009/0218179 | A1 |   | 9/2009 | Yokoyama et al. |
| 2010/0017088 | A1 |   | 1/2010 | Joyce |
| 2010/0235065 | A1 |   | 9/2010 | Logan et al. |
| 2011/0054758 | A1 | * | 3/2011 | Bae et al. ....................... 701/92 |

FOREIGN PATENT DOCUMENTS

JP 5092760 4/1993
JP 11072129 3/1999

* cited by examiner

Primary Examiner — Jason Holloway
(74) Attorney, Agent, or Firm — Snell & Wilmer LLP (57) ABSTRACT A brake rotor temperature determination or estimation system and method for controlling output power of a power source in a vehicle. The system includes a brake rotor, a processor, a memory, a speed sensor and a temperature sensor. The speed sensor senses a speed of the vehicle. The temperature sensor senses a temperature of a brake rotor or ambient air in a vicinity of the brake rotor. Based upon data stored in the memory and inputs from the speed sensor or the temperature sensor, the processor determines if an output power of the power source should be limited based on rotor temperature thresholds. The power limits may be defined as discrete power limits corresponding to the particular thresholds of rotor temperature or may be defined as interpolated data values along a linear or nonlinear ramp or slope.

20 Claims, 5 Drawing Sheets

POWER LIMITING SYSTEM AND METHOD BASED UPON BRAKE ROTOR TEMPERATURE DETERMINATION

CROSS REFERENCE TO RELATED APPLICATIONS

This application claims the benefit and priority of U.S. Provisional Application No. 61/623,502, entitled Brake Rotor Temperature Estimation System, filed on Apr. 12, 2012, the entire contents of which are hereby incorporated by reference herein.

BACKGROUND

1. Field

The present invention relates generally to vehicle power generation or output systems and improvements thereof. More particularly, the present invention relates to variable power output systems and methods for an automobile or other vehicle based upon a braking system characteristic and improvements thereof.

2. Description of the Related Art

Braking systems on conventional automobiles or other vehicles commonly employ friction-based elements (e.g., brake pads) for rubbing against other equipment or components (e.g., rotors) connected with the wheels for slowing down or stopping the vehicle. During particularly hard braking, the friction-based elements are pressed with increased force in order to amass greater frictional resistance for halting the vehicle in a reduced timeframe or distance. Due to the nature of such friction-based braking systems, wear results from the constant rubbing of these elements and components and typically requires regular parts replacement or refurbishment. Moreover, the longer the various elements or components are utilized without maintenance, the less effective they become in stopping the vehicle. Thus, in addition to absolute brake failure, brake fade or reduced effectiveness of the elements or components can also result.

Unfortunately, while use of non-friction based systems may help with certain of the above disadvantages, such systems have proven to be prohibitively expensive in many vehicle or automotive applications. In addition, systems for determining heat characteristics for friction based braking systems have not adequately resolved the issues with brake fade or failure or for extending the useful life of braking equipment. Conventional methods of merely alerting an owner of the vehicle when it is recommended to replace or repair components of the braking system usually only provide such alerts when braking performance has already significantly deteriorated. Not only do these methods not address the problem of steadily decreasing braking performance through regular use, but they also rely upon owners themselves to act in response and not passively ignore such alerts. Thus, a system or method which can help extend the useable life of braking equipment or for preventing brake fade or failure would be desirable.

Ideally, a power limiting system or method for a vehicle would be capable of controlling characteristics of the vehicle based on at least a portion of a braking system of the vehicle. A power limiting system or method would ideally allow for one or more variations in power output based upon current characteristics of the braking system. Moreover, a power limiting system or method would ideally allow for accurate determination of a characteristic of the braking system of the vehicle for use in appropriately controlling power or energy output of a component of the vehicle. A power limiting system or method would also ideally be inexpensive to manufacture and integrate with other systems or components of the vehicle.

SUMMARY

A system or method for reducing output power of a power source of a vehicle according to a characteristic of a braking system of the vehicle is described. In one embodiment, a method for controlling output power from a power source of a vehicle may include the steps of providing a processor coupled with the vehicle and a rotor coupled with the vehicle for slowing the vehicle during a braking event, determining, using the processor, an instantaneous temperature of the rotor of the vehicle, determining, using the processor, if the instantaneous temperature of the rotor is greater than a first threshold, and limiting the output power from the power source of the vehicle to a first limit if the instantaneous temperature of the rotor is greater than the first threshold.

In another embodiment, a method for limiting energy from a battery of a vehicle may include the steps of providing a speed sensor coupled with the vehicle, a temperature sensor coupled with the vehicle and a processor coupled with the vehicle and electrically connected with the speed sensor and the temperature sensor, providing a rotor coupled with the vehicle for use during a braking event of the vehicle to slow the vehicle, determining, using the speed sensor, a speed of the vehicle, determining, using the temperature sensor, an ambient temperature in a location exterior to the vehicle, determining, using the processor, an elapsed time from the braking event of the vehicle, determining, using the processor, a temperature of the rotor based on the speed of the vehicle, the ambient temperature in the location exterior to the vehicle and the elapsed time from the braking event of the vehicle, determining, using the processor, if the temperature of the rotor is greater than a first predetermined temperature, and limiting the energy from the battery of the vehicle to a predetermined amount if the temperature of the rotor is greater than the first predetermined temperature.

In still another embodiment, a system for controlling output power from a power source of a vehicle may include a rotor configured to slow the vehicle during a braking event of the vehicle, a first sensor configured to sense a temperature of air outside of the vehicle, and a processor electrically connected with the first sensor and configured to determine a temperature of the rotor based on a time from the braking event of the vehicle and the temperature of air sensed by the first sensor, the processor further configured to limit the output power from the power source of the vehicle to a first limit if the temperature of the rotor is greater than a first predetermined threshold.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
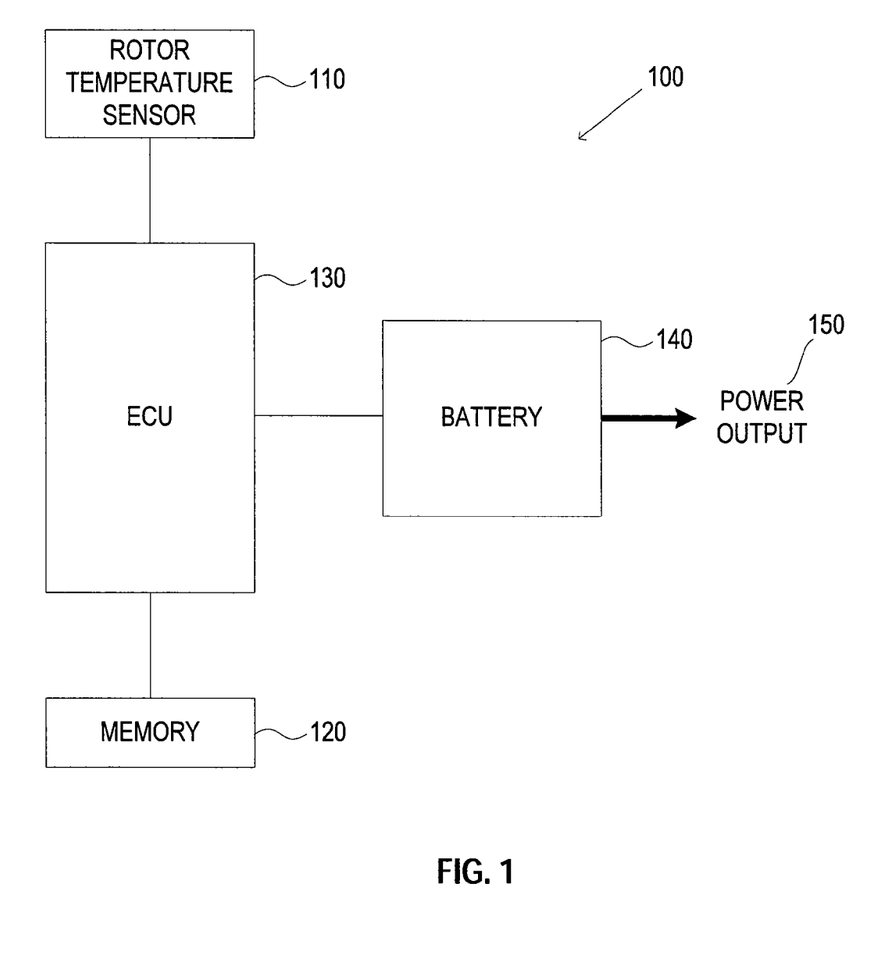
FIG. 1 is a block diagram of a rotor temperature determination system for reducing output power of a battery of a vehicle according to an embodiment of the present invention.

Referring to FIG. 1, a rotor temperature determination system 100 for reducing output power of a battery for a vehicle is shown. The rotor temperature determination system 100 includes various devices or components interfacing with an engine control unit ("ECU") 130 or other processor of the vehicle. Because vehicle braking systems commonly employ friction-based components, such as brake rotors, calipers and brake pads, that encounter frequent wear in order to facilitate the slowing of the vehicle, the equipment often requires regular replacement or maintenance to ensure optimal or at least sufficient braking performance for the vehicle. In the present embodiment and to aid in the improvement of brake life, the ECU 130 communicates with the various devices or components for controlling a battery 140, as discussed in greater detail herein.

The ECU 130 is configured to determine a temperature of one or more rotors of the vehicle in order to appropriately control a power output 150 from the battery 140. As rotor temperature increases, performance of the braking components (e.g., friction due to brake pads of calipers in contact with the rotors) decreases, leading to brake fade and/or failure and thus resulting in a longer overall braking distance. Such diminished braking performance may be mitigated by automatically reducing the power output 150 from the battery 140 used to power the vehicle based upon the temperature of the rotors. A rotor temperature sensor 110 is coupled to the vehicle and electrically connected with the ECU 130. The rotor temperature sensor 110 is configured to sense a temperature of a rotor of the vehicle for providing such data to the ECU 130 for use in estimating or determining the temperature of the rotor. Thus, the ECU 130 interfaces with or receives signals or information from the rotor temperature sensor 110 in order to determine the rotor temperature for controlling the power output 150 of the battery 140.

A memory 120 is also electrically connected with the ECU 130 and stores data for use in controlling the power output 150 of the battery 140 by the ECU 130. For example, the memory 120 may contain one or more threshold levels or values for rotor temperature. The ECU 130, upon receipt of a signal from the rotor temperature sensor 110 indicating a temperature of a rotor of the vehicle, may reference data stored in the memory 120 to determine whether the instantaneous temperature of the rotor exceeds one or more of the threshold levels or values. If so, the ECU 130 controls the battery 140 to output a lower or reduced power or energy output 150 than might otherwise be capable by the battery 140. The memory 120 may also store one or more power limits for lookup by the ECU 130 based upon the temperature of the rotor, as discussed in greater detail herein.

Figure 2:
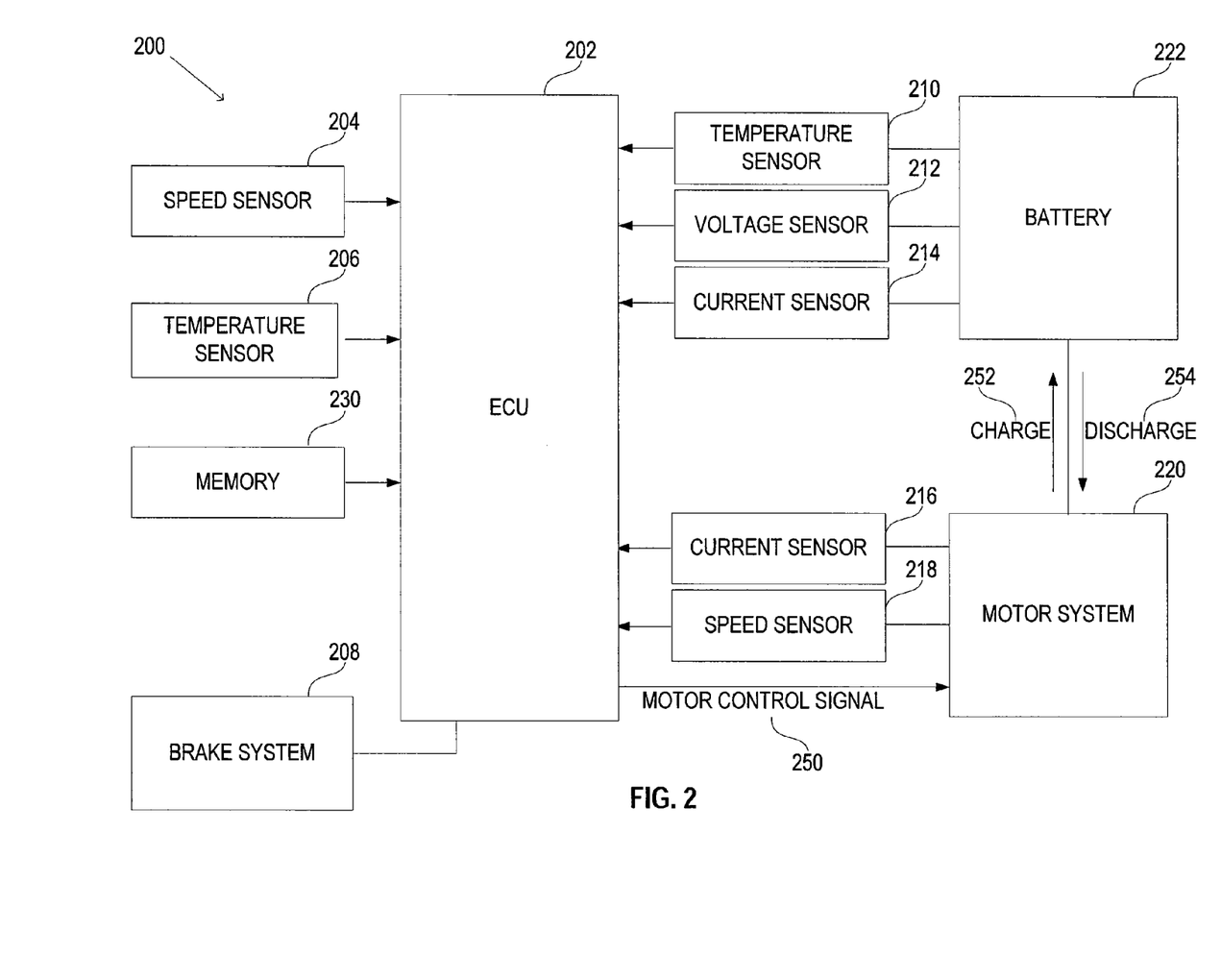
FIG. 2 is a block diagram of a rotor temperature estimation system for reducing output power of a battery of a vehicle according to an embodiment of the present invention.

FIG. 2 shows a block diagram of a rotor temperature estimation system 200 for reducing output power of a battery of a vehicle. Certain structural or functional features of the rotor temperature estimation system 200 may be the same as or similar to the rotor temperature determination system 100 of FIG. 1. The rotor temperature estimation system 200, however, utilizes a variety of devices and components other than a rotor temperature sensor for determining or estimating a temperature of one or more rotors of the vehicle, as discussed in greater detail herein. In an alternative embodiment, certain of the devices and components described below for the rotor temperature estimation system 200 may be used in combination with a rotor temperature sensor (e.g., the rotor temperature sensor 110 of FIG. 1).

An ECU 202 or other processor of the vehicle is configured to determine a temperature of one or more rotors of the vehicle in order to appropriately control a power output for a motor system 220 (e.g., an electric motor, gearing, conductive power lines, etc.) of the vehicle. A battery 222 interfaces with the motor system 220 by either receiving energy or power from the motor system 220 during charging 252 for storage in the battery 222 or by providing energy or power to the motor system 220 during discharging 254 to move the vehicle. The ECU 202 is electrically connected with the motor system 220 and is configured to provide a motor control signal 250 to the motor system 220 to control operation of the motor system 220. In certain embodiments, a variety of sensors may be connected to the battery 222, each configured to provide a signal to the ECU 202. For example, a temperature sensor 210, a voltage sensor 212 and a current sensor 214 may provide the ECU 202 with instantaneous data or signals concerning the temperature, voltage level and current level of the battery 222, respectively. Similarly, a variety of sensors may be connected to one or more components of the motor system 220, each configured to provide a signal to the ECU 202. For example, a current sensor 216 and a speed sensor 218 may provide the ECU 202 with instantaneous data or signals concerning the current and speed of a motor of the motor system 220, respectively. The ECU 202 may utilize these signals to generate or otherwise determine the appropriate motor control signal 250 for desired operation of the motor system 220.

The same as or similar to the previous discussion for FIG. 1, the ECU 202 may aid in reducing brake fade or failure or in improving brake life of one or more components of a brake system 208 of the vehicle. The brake system 208 may include a brake pedal, brake lines, calipers, rotors, brake pads and associated electronics, for exerting a frictional force upon a braking event in order to slow or bring the vehicle to a stop. The braking event may be any event that causes a slowing of the vehicle (e.g., a frictional force exerted by brake pads upon rotors of the vehicle). For example, a braking event may be initiated by a driver of the vehicle (e.g., by pressing upon a brake pedal to causing the brake pads to contact the rotors). In another example, a braking event may be initiated automatically by a system of the vehicle (e.g., slowing of the vehicle upon sensing of an object within a particular vicinity of the vehicle). The braking event may be deemed to occur at the initial moment of braking the vehicle or, alternatively, at any point during the slowing of the vehicle (e.g., during the exertion of frictional force exerted by the brake pads upon the rotors of the vehicle). The ECU 202 is configured to receive or determine, based on the brake system 208, a time between a plurality of braking events or an elapsed time from a single prior braking event. The ECU 202 controls (e.g., via the motor control signal 250) energy or power output from the battery 222 to the motor system 220 (e.g., during discharge 254) based upon a temperature of a rotor of the brake system 208.

A speed sensor 204 is coupled with the vehicle and electrically connected with the ECU 202. The speed sensor 202 is configured to sense a speed of the vehicle or a component of the vehicle. In an alternative embodiment, no speed sensor may be needed and the speed of the vehicle may be estimated or calculated based upon other inputs (e.g., RPM and gearing of an engine, rotations or angular velocity of a wheel of the vehicle, etc.). A temperature sensor 206 is also coupled with the vehicle and electrically connected with the ECU 202. The temperature sensor 206 is configured to sense or determine an ambient temperature of the outside environment (e.g., air) surrounding the vehicle. The temperature sensor 206 may be positioned at any of a variety of possible locations on the vehicle, for example, in proximity to a wheel or a rotor of the vehicle.

A memory 230 configured to store data is also electrically (e.g., wired or wirelessly) connected with the ECU 202. The memory 230 may store data values, algorithms or logical steps utilized by the ECU 202 for determining the rotor temperature and/or for controlling the power output (e.g., the discharge 254) of the battery 222. In one embodiment, the memory 230 may store a coefficient for friction heat data value configured to be looked-up or utilized by the ECU 202. The ECU 202 may therefore use relationships for braking energy and vehicle speed, sensed by the speed sensor 204, with the assumed coefficient for friction heat, stored in the memory 230, to estimate or determine a temperature of or for the rotor. The ECU 202 additionally may account for cool-down of the rotor between braking events via interfacing with the speed sensor 204, the temperature sensor 206 and/or one or more components of the brake system 208.

Figure 3:
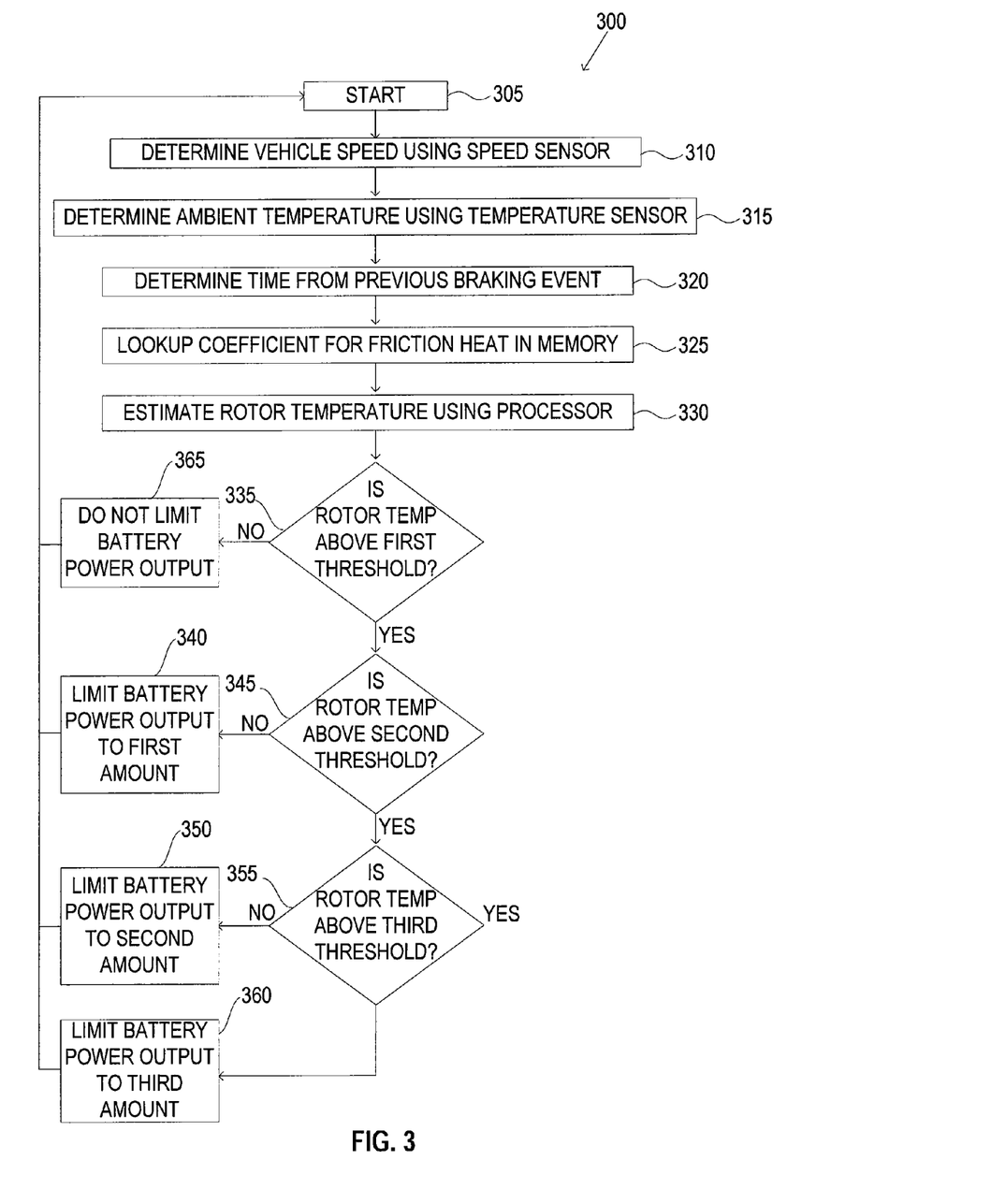
FIG. 3 is a flowchart of a rotor temperature estimation system for reducing output power of a battery of a vehicle according to an embodiment of the present invention.

FIG. 3 shows a flowchart of a rotor temperature estimation system 300 for reducing output power of a battery for a vehicle. The rotor temperature estimation system 300 may be the same as or similar to the systems previously described for FIGS. 1-2. The various logical steps of the rotor temperature estimation system 300 may be performed by a processor in communication with a memory, a speed sensor, a temperature sensor and a brake system or braking components, as discussed in greater detail herein. In step 305, the process or method of the rotor temperature estimation system 300 starts, for example, after the vehicle is turned on, reaches a particular vehicle speed or any other period of time where battery power is desirably controlled based upon a temperature of a rotor of the vehicle.

In step 310, the vehicle speed is determined by the processor using the speed sensor. In step 315, the ambient temperature outside of the vehicle is determined by the processor using the temperature sensor. In step 320, an elapsed time from a previous braking event (e.g., a frictional force exerted on a rotor of the vehicle by a caliper in response to a driver of the vehicle engaging with a brake pedal) is determined by the processor using one or more components of the brake system. In step 325, the processor looks up a coefficient for friction heat in the memory. Based upon these inputs, in step 330, the processor estimates a temperature of the rotor of the vehicle. To estimate the temperature, the processor may use the vehicle speed determined in step 310, the amount of time determined from the prior brake event in step 320, the coefficient for friction heat determined in step 325 and also may take into account any cool-down of the rotor based upon the ambient temperature determined in step 315.

In step 335, the processor determines if the rotor temperature estimated in step 330 is above a first (e.g., a minimal power reduction) threshold. For example, the first threshold may be 200° C. If not, operation continues to step 365. In step 365, the processor does not control, reduce or otherwise command or place a limit on the battery power output of the vehicle in response to the estimated rotor temperature. For example, the temperature of the rotor may be low enough so as to not affect their braking performance to a degree where brake fade is likely to occur. The logical steps of the rotor temperature estimation system 300 may then be repeated by returning to step 310 to begin certain steps of the process again. However, if the rotor temperature estimated in step 330 is above the first threshold, power reduction from the battery is desired and operation continues to step 345.

In step 345, the processor determines if the rotor temperature estimated in step 330 is above a second (e.g., a moderate or intermediate power reduction) threshold. The second threshold is a threshold higher than the first threshold. For example, the second threshold may be 250° C. If not, operation continues to step 340. In step 340, the processor controls, limits or otherwise commands the battery power output of the vehicle to be limited or capped to a first predetermined value or amount in response to the estimated rotor temperature. For example, such a power limit for the vehicle limit may aid in preventing brake failure during times when the rotor is deemed to be hotter than desired for optimal braking functionality. For example, if the nominal maximum output power for the battery is 100 kW, in step 340, the maximum output power from the battery may be limited to only 90 kW. The logical steps of the rotor temperature estimation system 300 may then be repeated by returning to step 310 to begin certain steps of the process again. However, if the rotor temperature estimated in step 330 is above the second threshold, operation continues to step 355.

In step 355, the processor determines if the rotor temperature estimated in step 330 is above a third (e.g., a maximal power reduction) threshold. The third threshold is a threshold higher than the second threshold. For example, the third threshold may be 260° C. If not, operation continues to step 350. In step 350, the processor controls, limits or otherwise commands the battery power output of the vehicle to be limited or capped to a second predetermined value or amount in response to the estimated rotor temperature. For example, if the nominal maximum output power for the battery is 100 kW, in step 350, the maximum output power from the battery may be limited to only 80 kW. The logical steps of the rotor temperature estimation system 300 may then be repeated by returning to step 310 to begin certain steps of the process again. However, if the rotor temperature estimated in step 330 is above the third threshold, operation continues to step 360.

In step 360, the processor controls, limits or otherwise commands the battery power output of the vehicle to be limited or capped to a third predetermined value or amount in response to the estimated rotor temperature. For example, if the nominal maximum output power for the battery is 100 kW, in step 360, the maximum output power from the battery may be limited to only 70 kW. The logical steps of the rotor temperature estimation system 300 may then be repeated by returning to step 310 to begin certain steps of the process again.

The various steps described for the rotor temperature estimation system 300 may see certain steps removed, added to, or performed in a different order than as explicitly shown in FIG. 3 in an alternative embodiment. For example, greater or fewer thresholds (e.g., only one threshold may be used) may be utilized with varying threshold levels as desired for reducing the power output of the battery or other power source of the vehicle by greater or lesser amounts. Certain embodiments may utilize additional or alternative methods for determining a temperature of a rotor of the vehicle (e.g., directly sensing the temperature of the rotor instead of estimating the temperature using elapsed time from a braking event). The various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

Figure 4:
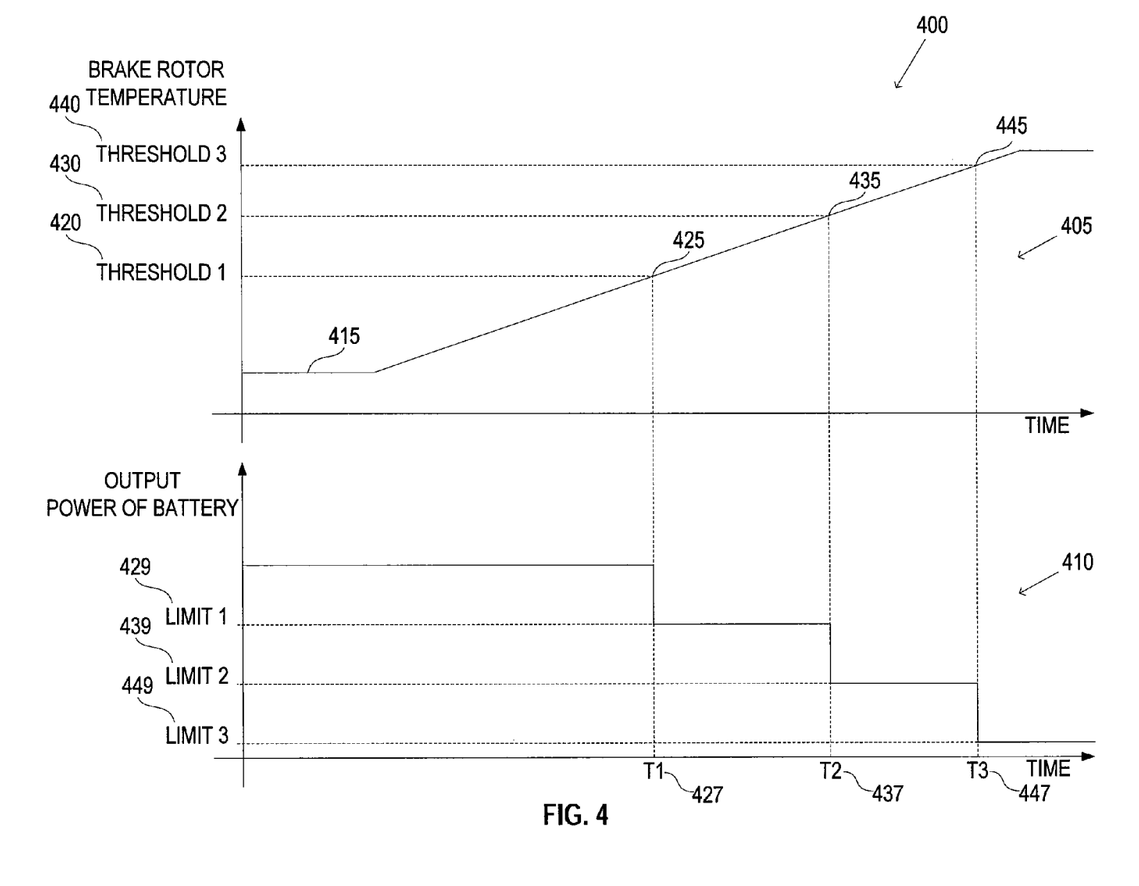
FIG. 4 is a graph showing a reduction of maximum output power of a battery based on brake rotor temperature due to operation of a rotor temperature estimation system according to an embodiment of the present invention.

FIG. 4 shows a graph of a power limiting system 400 for a battery of a vehicle based upon brake rotor temperature. Certain structural or functional features of the power limiting system 400 may be the same as or similar to previously described features for FIGS. 1-3. A first graph 405 indicates brake rotor temperature, plotted on a y-axis, with respect to time, plotted on an x-axis. A second graph 410 indicates output power of the battery of the vehicle, plotted on a y-axis, with respect to time, plotted on an x-axis. Thus, by examining the first graph 405 and the second graph 410 together, operational characteristics of the power limiting system 400 may be seen.

On the first graph 405, the brake rotor temperature 415 is plotted and includes a portion with an increasing slope, indicating a steadily increasing temperature with respect to time. The power limiting system 400 includes a first brake rotor temperature threshold 420, a second brake rotor temperature threshold 430 and a third brake rotor temperature threshold 440. These thresholds (420, 430, 440) may be predetermined values stored in a memory of the power limiting system and used for determining the brake rotor temperature levels wherein the output power of the battery of the vehicle should be reduced or limited. Each threshold (420, 430, 440) corresponds to a discrete output power limit, as shown on the second graph 410 and as discussed in greater detail herein.

As shown, at a first crossover point 425, located a first time 427, the brake rotor temperature 415 begins to exceed the first brake rotor temperature threshold 420. Substantially at this first time 427, the output power of the battery in the vehicle is reduced (e.g., from its nominal, maximal output) or otherwise limited to a first power limit 429. Thus, for as long as the brake rotor temperature 415 exceeds the first brake rotor temperature threshold 420, the output power of the battery in the vehicle remains limited to the first power limit 429. In an alternative embodiment, different threshold values may be setup for increasing brake rotor temperature or decreasing brake rotor temperature. In one example, the output power of the battery may remain limited to the first power limit 429 even if the brake rotor temperature 415 subsequently decreases below the first brake rotor temperature threshold 420 until passing an additional threshold lower than the first brake rotor temperature threshold 420. In still other embodiments, power limits may additionally or alternatively be based upon an elapsed time that the brake rotor temperature exceeds a particular threshold (e.g., additional reductions of the output power of the battery may be utilized if the brake rotor temperature 415 exceeds the first brake rotor threshold 420 for a predetermined amount of time).

At a second crossover point 435, located at a second time 437, the brake rotor temperature 415 begins to exceed the second brake rotor temperature threshold 430. Substantially at this second time 437, the output power of the battery in the vehicle is reduced or limited to a second power limit 439. Thus, for as long as the brake rotor temperature 415 exceeds the second brake rotor temperature threshold 430, the output power of the battery in the vehicle remains limited to the second power limit 437. Similarly, at a third crossover point 445, located at a third time 447, the brake rotor temperature 415 begins to exceed the third brake rotor temperature threshold 440. Substantially at this third time 447, the output power of the battery in the vehicle is reduced or limited to a third power limit 449. Thus, for as long as the brake rotor temperature 415 exceeds the third brake rotor temperature threshold 440, the output power of the battery in the vehicle remains limited to the third power limit 437. The same or similar operation as discussed above for the first brake rotor temperature threshold 420 or the first power limit 429 may similarly be utilized for the second or third brake rotor temperature thresholds (430, 440) or the second or third power limits (439, 449).

As shown, the power limiting system 400 thus exhibits step-function operation for the power limiting of a battery or other power source of the vehicle based upon brake rotor temperature. An alternative embodiment may set or fix the brake rotor temperature thresholds (420, 430, 440) to any desired values. Although the power limits (429, 439, 449) shown in FIG. 4 indicate even or equal reductions in output power with respect to one another, an alternative embodiment may utilize uneven or unequal reductions in output power for the various brake rotor temperature thresholds. Greater or fewer temperature thresholds and/or power limits may be utilized in an alternative embodiment.

Figure 5:
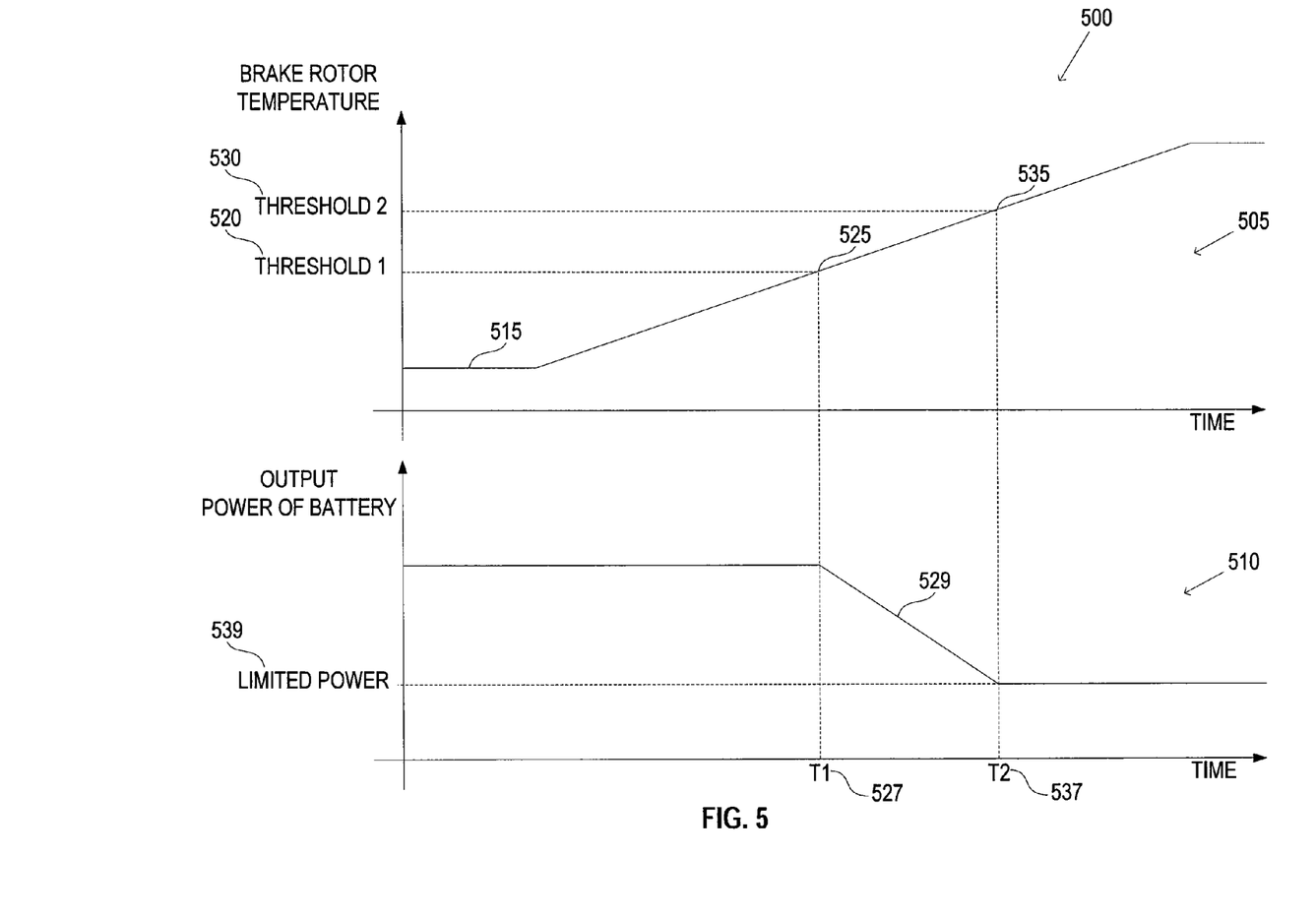
FIG. 5 is a graph showing a reduction of maximum output power of a battery based on brake rotor temperature due to operation of a rotor temperature estimation system according to an embodiment of the present invention.

FIG. 5 shows a graph of a power limiting system 500 for a battery of a vehicle based upon brake rotor temperature. Certain structural or functional features of the power limiting system 500 may be the same as or similar to previously described features for FIGS. 1-4. A first graph 505 indicates brake rotor temperature, plotted on a y-axis, with respect to time, plotted on an x-axis. A second graph 510 indicates output power of the battery of the vehicle, plotted on a y-axis, with respect to time, plotted on an x-axis. Thus, by looking at the first graph 505 and the second graph 510 together, operational characteristics of the power limiting system 500 may be seen.

On the first graph 505, brake rotor temperature 515 is plotted and includes a portion with an increasing slope, indicating a steadily increasing temperature with respect to time. The power limiting system 500 includes a first brake rotor temperature threshold 520 and a second brake rotor temperature threshold 530. These thresholds (520, 530) may be predetermined values stored in a memory of the power limiting system and used for determining the brake rotor temperature levels wherein output power of the battery of the vehicle should be reduced or limited, as shown on the second graph 510 and as discussed in greater detail herein.

As shown, at a first crossover point 525, located a first time 527, the brake rotor temperature 515 begins to exceed the first brake rotor temperature threshold 520. Substantially at this first time 527, the output power of the battery in the vehicle is reduced (e.g., from a nominal, maximal output) to a lesser output power. Similarly, at a second crossover point 535, located at a second time 537, the brake rotor temperature 515 begins to exceed the second brake rotor temperature threshold 530. Substantially at this second time 537, the output power of the battery in the vehicle reaches a minimum or limited output power 539. However, in contrast to the power limiting system 400 which utilized substantially step-based or digitized power output limits and wherein each step corresponded to a particular brake rotor temperature threshold (see FIG. 4), power limits shown for the power limiting system 500 utilize a gradual, sloped or otherwise interpolated reduction or limit 529 on output power for brake rotor temperature 515 between the brake rotor temperature thresholds (520, 530). This reduction or limit 529 may be obtained or determined for the output power of the battery based upon a function or algorithm stored in a memory of the power limiting system 500 and thus can provide a smooth and/or less noticeable drop in power. An alternative embodiment may utilize greater or fewer power limit levels and/or thresholds as desired, alternative slopes (e.g., steeper or more gradual), non-linear transitions between power limit levels or any other type of algorithm, function or look-up table desired for determining a reduced or limited power level for the battery based upon brake rotor temperature.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for controlling output power from a power source of a vehicle, the method comprising the steps of:
   providing a processor coupled with the vehicle and a rotor coupled with the vehicle for slowing the vehicle during a braking event;
   determining, using the processor, an instantaneous temperature of the rotor of the vehicle;
   determining, using the processor, if the instantaneous temperature of the rotor is greater than a first threshold; and
   limiting the output power from the power source of the vehicle to a first limit if the instantaneous temperature of the rotor is greater than the first threshold.

2. The method of claim 1 further comprising the steps of:
   determining, using the processor, if the instantaneous temperature of the rotor is greater than a second threshold, the second threshold higher than the first threshold; and
   limiting the output power from the power source of the vehicle to a second limit lower than the first limit if the instantaneous temperature of the rotor is greater than the second threshold.

3. The method of claim 2 further comprising the step of determining, using the processor, an interpolated output power limit between the first limit and the second limit for the instantaneous temperature of the rotor that is between the first threshold and the second threshold.

4. The method of claim 3 wherein the interpolated output power is determined using linear interpolation.

5. The method of claim 2 further comprising the step of limiting the output power from the power source of the vehicle to the first limit if the instantaneous temperature of the rotor is between the first threshold and the second threshold.

6. The method of claim 2 further comprising the steps of:
   determining, using the processor, if the instantaneous temperature of the rotor is greater than a third threshold, the third threshold higher than the second threshold; and
   limiting the output power from the power source of the vehicle to a third limit lower than the second limit if the instantaneous temperature of the rotor is greater than the third threshold.

7. The method of claim 1 further comprising the step of providing a temperature sensor coupled with the processor for sensing the instantaneous temperature of the rotor.

8. The method of claim 1 further comprising the steps of:
   providing a speed sensor coupled with the processor for determining a speed of the vehicle; and
   providing a temperature sensor coupled with the processor for determining an ambient temperature outside of the vehicle,
   wherein the step of determining an instantaneous temperature of the rotor of the vehicle includes determining, using the processor, an elapsed time from the braking event and calculating the instantaneous temperature using the elapsed time, the speed of the vehicle and the ambient temperature outside of the vehicle.

9. The method of claim 8 further comprising the step of providing a memory coupled with the processor, the memory configured to store a data value corresponding to a coefficient for friction heat.

10. A method for limiting energy from a battery of a vehicle, the method comprising the steps of:
    providing a speed sensor coupled with the vehicle, a temperature sensor coupled with the vehicle and a processor coupled with the vehicle and electrically connected with the speed sensor and the temperature sensor;
    providing a rotor coupled with the vehicle for use during a braking event of the vehicle to slow the vehicle;
    determining, using the speed sensor, a speed of the vehicle;
    determining, using the temperature sensor, an ambient temperature in a location exterior to the vehicle;
    determining, using the processor, an elapsed time from the braking event of the vehicle;
    determining, using the processor, a temperature of the rotor based on the speed of the vehicle, the ambient temperature in the location exterior to the vehicle and the elapsed time from the braking event of the vehicle;
    determining, using the processor, if the temperature of the rotor is greater than a first predetermined temperature; and
    limiting the energy from the battery of the vehicle to a predetermined amount if the temperature of the rotor is greater than the first predetermined temperature.

11. The method of claim 10 further comprising the steps of:
    determining, using the processor, if the temperature of the rotor is greater than a second predetermined temperature that is greater than the first predetermined temperature; and
    limiting the energy from the battery of the vehicle to a second predetermined amount if the temperature of the rotor is greater than the first predetermined temperature and not greater than the second predetermined temperature.

12. The method of claim 11 wherein the second predetermined amount corresponds to a value along a linear interpolation between a maximum output energy of the battery and the first predetermined amount.

13. The method of claim 12 further comprising the step of looking up, in a memory, a coefficient for friction heat for the determining of the rotor temperature.

14. The method of claim 10 wherein the step of determining the rotor temperature is based on a cool-down of the rotor during the elapsed time from the braking event due to the ambient temperature.

15. A system for controlling output power from a power source of a vehicle comprising:
a rotor configured to slow the vehicle during a braking event of the vehicle;
a first sensor configured to sense a temperature of air outside of the vehicle; and
a processor electrically connected with the first sensor and configured, to determine a temperature of the rotor based on a time from the braking event of the vehicle and the temperature of air sensed by the first sensor, the processor further configured to limit the output power from the power source of the vehicle to a first limit if the temperature of the rotor is greater than a first predetermined threshold.

16. The system of claim 15 wherein the processor is configured to limit the output power from the power source of the vehicle to a second limit lower than the first limit if the temperature of the rotor is greater than a second threshold greater than the first threshold.

17. The system of claim 16 wherein the processor is configured to limit the output power from the power source to an interpolated value between the first limit and the second limit if the temperature of the rotor is between the first threshold and the second threshold.

18. The system of claim 16 wherein the processor is configured to limit the output power from the power source of the vehicle to a third limit lower than the second limit if the temperature of the rotor is greater than a third threshold greater than the second threshold.

19. The system of claim 15 further comprising a second sensor electrically connected with the processor, the second sensor configured to determine a speed of the vehicle and wherein the processor is configured to determine the temperature of the rotor based on the speed of the vehicle.

20. The system of claim 19 further comprising a memory electrically connected with the processor and configured to store a data value corresponding to a coefficient for friction heat, the processor configured to use the data value for determining the temperature of the rotor.

* * * * *